UNITED STATES PATENT OFFICE.

GOTTHOLD FUCHS, OF BIEBRICH, GERMANY, ASSIGNOR TO KALLE & COMPANY, OF BIEBRICH, GERMANY.

HYDROCHLORID OF CINNAMYL-QUININ AND PROCESS OF MAKING SAME.

SPECIFICATION forming part of Letters Patent No. 692,437, dated February 4, 1902.

Application filed October 28, 1901. Serial No. 80,316. (No specimens.)

*To all whom it may concern:*

Be it known that I, GOTTHOLD FUCHS, a subject of the King of Prussia, Emperor of Germany, residing at Biebrich, Germany, have invented certain new and useful Improvements in the Manufacture of the Hydrochlorid of Cinnamyl-Quinin, of which the following is a specification.

I have found that the hydrochloric salt of cinnamyl-quinin is obtained in pure state and by a uniform reaction if quinin freed from water of crystallization is acted upon by cinnamyl chlorid. This new quinin derivative is absolutely tasteless and shows a considerable antipyretic effect.

In the following I give an example for the manner in which I obtain the new compound: 3.2 kilos of anhydrous quinin are stirred up with ten kilos of benzene, (or some other indifferent solvent.) To this mixture I add a solution of 1.7 kilos of cinnamyl chlorid in benzene. The mass grows warm spontaneously and changes into a clear solution, from which the reaction product separates out by degrees. The separation being finished, the benzene is filtered off the precipitate, which is then recrystallized from hot water. The so-obtained hydrochlorid of cinnamyl-quinin crystallizes in white needles, melting at 235° to 236° centigrade, difficultly soluble in water, and easily soluble in concentrated and dilute alcohol. By an analysis the amount of chlorin contained in the new product was found to be 7.31 per cent.—almost fully corresponding to the formula $C_{29}H_{30}N_2O_3HCl$. The cinnamyl-quinin base is prepared by adding an excess of ammonia to an aqueous solution of the neutral or, better, the acid hydrochlorid of cinnamyl-quinin and by filtering and washing the so-obtained precipitate.

Now what I claim is—

1. As a new process the manufacture of the hydrochlorid of cinnamyl-quinin by acting with cinnamyl chlorid on quinin freed from water of crystallization substantially as described.

2. As a new product the hydrochlorid of cinnamyl-quinin obtained by the action of cinnamyl chlorid on anhydrous quinin representing a tasteless compound melting at 235° to 236° centigrade, difficultly soluble in water, easily soluble in alcohol and crystallizing in white needles.

In testimony whereof I have signed my name to this specification in the presence of two subscribing witnesses.

GOTTHOLD FUCHS.

Witnesses:
IGNAT ROSENBERG,
JEAN GRUND.